July 5, 1960
G. W. RIENKS
2,943,798
VARIABLE SPRAY PATTERN LAWN SPRINKLER
Filed Sept. 13, 1954
3 Sheets-Sheet 1
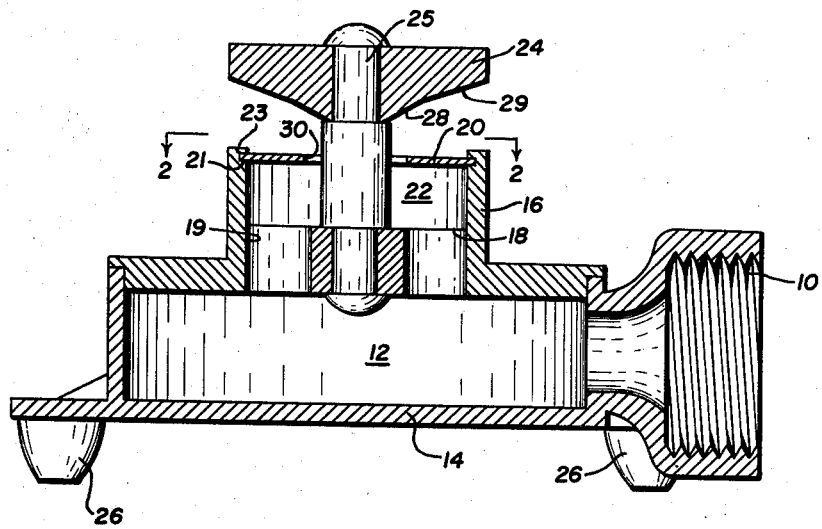
FIG.—1
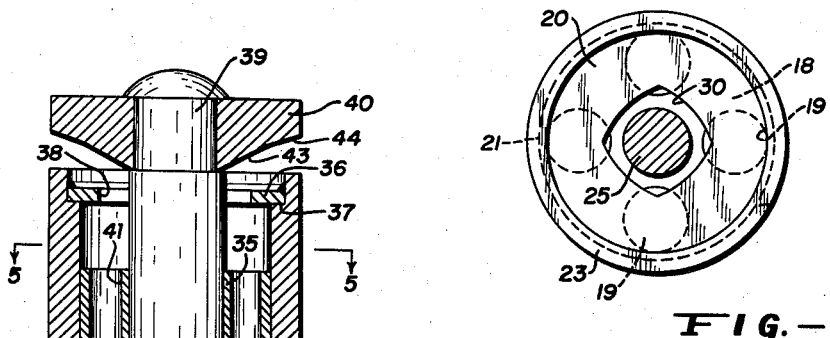
FIG.—2
FIG.—3
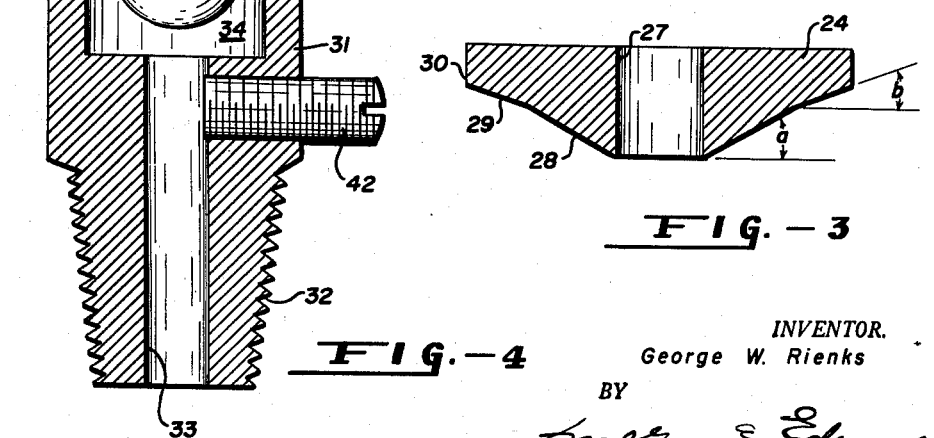
FIG.—4
INVENTOR.
George W. Rienks
BY
ATTORNEYS July 5, 1960

G. W. RIENKS 2,943,798

VARIABLE SPRAY PATTERN LAWN SPRINKLER

Filed Sept. 13, 1954

INVENTOR.
George W. Rienks
BY
Matthew & Edwards
ATTORNEYS

July 5, 1960  G. W. RIENKS  2,943,798
VARIABLE SPRAY PATTERN LAWN SPRINKLER
Filed Sept. 13, 1954  3 Sheets-Sheet 3

INVENTOR.
George W. Rienks
BY
ATTORNEYS

United States Patent Office 2,943,798
Patented July 5, 1960

2,943,798

VARIABLE SPRAY PATTERN LAWN SPRINKLER

George W. Rienks, 734 Cook St., Denver, Colo.

Filed Sept. 13, 1954, Ser. No. 455,408

2 Claims. (Cl. 239—520)

This invention relates to spray devices, and more particularly to lawn sprinkler nozzles adapted to uniformly distribute water over a pattern or an area of predetermined outline.

In prior practices, spray nozzles have been constructed to throw a circular or a square pattern of spray, or of various segments thereof, to provide irrigation for a particular area. Although nozzles have been proposed which will provide a predetermined pattern, no provision has been made to have a completely filled pattern. In other words, the outline of the pattern may be substantially complete, but the internal areas of the pattern are not wetted by the spray. So while the perimeter of the area is irrigated, the internal area thereof is inadequately wetted.

It is an object, therefore, of the present invention to provide a lawn sprinkler adapted to uniformly distribute water throughout the complete area of a predetermined pattern.

It is another object of the present invention to provide a simplified spray device for uniformly distributing water throughout the area of a predetermined pattern.

It is a further object of the present invention to provide a sprinkler nozzle which is readily adjustable to maintain a low head and still spread fluid over a substantial area in a predetermined pattern, and to uniformly distribute the fluid throughout the area of the pattern.

These and other objects and advantages, which will be understood and appreciated by those skilled in the art from a consideration of the present disclosure, are set out more fully in the accompanying description and drawings, in which:

Fig. 1 is a cross sectional elevation of a device according to the invention;

Fig. 2 is a detail in partial section taken along section line 2—2 of the device of Fig. 1;

Fig. 3 is a detail of the head or deflection surface of the sprinkler;

Fig. 4 is a cross sectional elevation of a modified sprinkler according to the invention;

Figure 5:
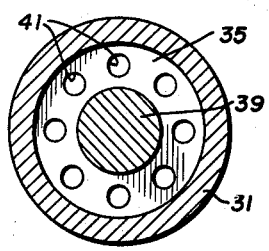
Fig. 5 is a cross sectional view taken along line 5—5 of the device of Fig. 4.

In general, the sprinkler of the present invention comprises a chamber having a liquid distributing means therein for directing the liquid in a substantially streamline flow to the head. The liquid passes out of the chamber through a shaped orifice or die, which orifice has a fluid passage approximating the shape of the desired pattern or outline of the area to be wetted. A distributing head juxtaposed above the orifice shapes the column of fluid egressing from the passage, according to the predetermined shape. The head distributes or deflects the column of liquid directed against it into a spray of the desired outline, and, also, provides means for completely wetting or filling the area inside the pattern or outline.

The sprinkler, illustrated in the Figures 1 through 3, includes a threaded inlet 10 which is adapted for connection to a hose connector or similar connector. The inlet communicates with an enlarged chamber 12 in the main body 14 of the sprinkler. An upstanding boss 16 on the body 14 houses a distributing block 18 and shaped orifice 20. The distributing block 18 includes a series of four holes 19 evenly spaced therearound for passing water in a substantially streamline, straight flow from chamber 12 upwardly into chamber 22 in the boss 16. A deflecting head 24 is secured to a stud 25 which is secured to the block 18. An orifice plate 20 is secured in a groove or rabbet 21 and the edge 23 thereof is rolled over to secure the plate in the boss. The stud 25 passes through the hole in the orifice plate, forming therewith a shaped annulus outlet. Stub legs 26 provide means for holding the sprinkler in relatively stable upright position when placed on a plane surface.

The distributing head comprises a block 24 having a hole 27 therethrough for mounting on a stud secured to the sprinkler body. The block 24 includes two annular surfaces, which are the surfaces of frustums of right cones, disposed at an acute angle to the horizontal and directed outwardly. The first annular surface 28 extends from about the hole 27 to approximately half the distance out from the hole to the edge of the block. The surface 28 is the surface of a truncated right cone disposed at an acute angle $a$ to a horizontal plane passing through the top surface of the truncated cone, which is substantially parallel to a plane passing through the outlet. The angle $a$ is an acute angle, and in the preferred form is about 30°; however, the angle may vary either larger or smaller than 30°. The acute angle $a$ maintains a low head or flat trajectory of the spray, and provides a sufficient angle to spread the spray a substantial distance from the sprinkler. Extending beyond the surface 28 is another surface 29 which is a truncated right cone having its surface at an acute angle $b$ to a plane passing through the top thereof. The angle $b$ is an acute angle, smaller than angle $a$. In the preferred form when angle $a$ is about 30°, angle $b$ is about 20°; however, angle $b$ may, likewise, be varied in accordance with the variance of angle $a$ so long as angle $b$ is smaller than angle $a$. With the head having angle $a$ at 30° and angle $b$ at 20°, a spray is provided which has an outline of the desired shape, as determined by the orifice plate 20, and the area within the outline is completely wetted by the spray issuing from the sprinkler.

The orifice plate, which substantially determines the spray pattern which the sprinkler will throw, comprises a substantially circular disc or plate 20 secured to the boss 16. The plate may be secured to the boss in any convenient manner. While a rolled-over edge is shown, a threaded nut, welding, soldering and the like may be utilized to secure the plate to the boss, the method of attachment being determined by whether the plate is removably or permanently affixed. The shape of the annular opening 30, formed between the shaped hole 22 and the stud 25 determines the shape of the column of water which passes therethrough and strikes the deflecting head. The shape of the outer edge of the opening 30 approximates the outline of the pattern of the spray thrown by the sprinkler. A substantially square pattern is obtained with the orifice opening 30, as illustrated in Figure 2. The opening 30 is a substantially square hole, which has arcuate sides of substantially the same radius as the orifice plate. While the radius of the arc of each of the sides, as shown, is substantially the same as the radius of the plate, the arc, however, may be changed to fit various conditions of flow, pressure, etc. In one case, for example, the radius of the orifice sides is $5/16$ of an inch with the center of each side on the circumference of the stud when the radius of the orifice plate is $7/8$ of an inch and the stud is $1/4$ of an inch. In another case the radius of the plate is $7/16$ of an inch, the stud is $3/16$ of an inch and the arc is 0.227 inches with a center on the circumference of the stud. The center of the arc of each of the sides is determined by the amount of space required between the stud 25 and the size of the shaped hole 30. The cross sectional area of the annular outlet determines, to a substantial measure, the size of the pattern in relation to the pressure available at the sprinkler.

By changing the contour of the stud 25, or providing a threaded connection therebetween, the head 24 may be raised or lowered in relation to the orifice plate 20. The raising and lowering of the head 24 in relation to the orifice plate will determine the size of the spray thrown, at a given pressure. For normal use as a garden spray, a predetermined and set head spacing for the sprinkler has been found to be satisfactory.

In the operation of the sprinkler, the inlet 10 is connected to a suitable fluid conduit, such as a hose, and the sprinkler is placed in position to irrigate the desired area. Water is forced through the inlet 10 into chamber 12, through the block 18 and out the orifice plate 20. The column of water rising out of the orifice plate 20 impinges on the areas 28 and 29 where it is deflected out and away from the sprinkler. The column of water is substantially a streamline or straight flow, substantially axially aligned with the stud 25. This streamline fluid stream impinging on the head 24 maintains a spray outline which corresponds to outline of the opening of the orifice plate at substantially all flows. There is substantially no swirling movement of the water impinging against the head 24, and substantially the same characteristics of spray will be realized at low pressures as well as at high pressures. In other words, at substantially all pressures the spray outline will vary in size, but the spray area will be completely wetted.

The deflecting areas 28 and 29 deflect the water rising up out of the annular space between the stud 25 and the shaped outlet orifice 30 in a low head, wide spray pattern. The acute angle at which the surfaces repose maintain a low head or flat trajectory of the spray. The two surfaces being set at different angles provides for deflection of the water to form the desired outline of the spray pattern and, also, completely and uniformly spray the area within the outline. The low head, that is, the maximum height of the spray above the ground, is a valuable feature to prevent waste of water and still provide adequate sprinkling over a substantial distance from the sprinkler. The low head permits sprinkling near a house which may have open windows, and permits sprinkling in a high wind without having the spray blown substantially out of its pattern.

The device illustrated in Figures 1 through 3 is a mobile sprinkler, that is, a sprinkler which is adapted for attachment to a garden hose where it is available for movement throughout an area substantially larger than the area which may be sprayed by a single sprinkler. The wide spread stub legs 26 permit the sprinkler to be moved around by pulling on the hose without being upset. Since the shaped orifice and the juxtaposed head with the two surfaces facing the orifice are the important features of controlling the size and shape of spray, it is obvious that the body of the sprinkler may be changed to any suitable shape. The mobile form of sprinkler is one type which is in wide spread use.

The sprinkler illustrated in Figures 4 and 5 is a stationary sprinkler which is adapted to be screwed into a coupling on the end of a vertical pipe or tapped into the wall of a pipe and thus supported in an upright position. The sprinkler has a threaded end 32 on the end of a body 31 for connection as aforesaid. A passageway 33 extends from the lower end of the body into a chamber 34. A distribution block 35 is secured in the chamber 34, and an orifice plate 36 is secured in a rabbet 37 thereabove. The orifice plate contains a shaped orifice 38. The plate 36 is welded or soldered in the rabbet 37. A stud 39 is secured in the block 35 and extends through the orifice plate 36. A head 40, similar to the head illustrated in Figure 3, is secured to the stud and is juxtaposed above the orifice plate 36. An adjusting screw 42 is threaded through the body and communicates with the passage 33 so that the size of the opening of the passage 33 may be adjusted. The block 35 has a series of eight small holes 41 spaced therearound, for providing a streamline or straight flowing column of water directed onto the deflecting surfaces. The number of holes may be varied from three or more and preferably four or more to provide good distribution of water onto the deflection surfaces.

The device of Figure 4 is particularly adaptable as a small size sprinkler, which is useful for green houses where sprinklers are to be retained in one position for spraying one particular area. The head 40 includes an area 43 and an area 44 which are set at acute angles to a horizontal plane passing through the top of each frustum. The surface 44 is disposed at a smaller angle than the surface 43.

As the sprinkler of Figure 4 is adapted for greenhouse use, a very low head spray is desired to prevent spraying the plants growing around the sprinkler. To provide such a low head spray, for example, the area 43 may be set at a 20° angle to the horizontal surface passing through the top of the frustum, and the surface 44 may be set at a 15° angle to a plane passing through the top of the frustum. These low angles will give a very low head spray, but will provide sufficient distribution to irrigate a substantial area surrounding the sprinkler.

Figure 6:
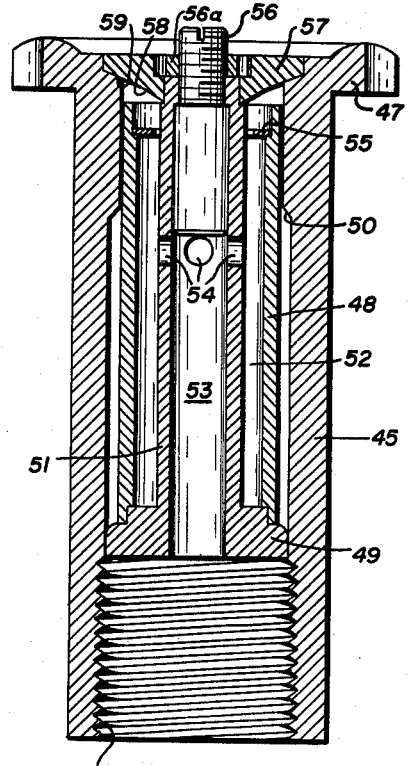
Fig. 6 is a further modified device according to the invention.
Figure 7:
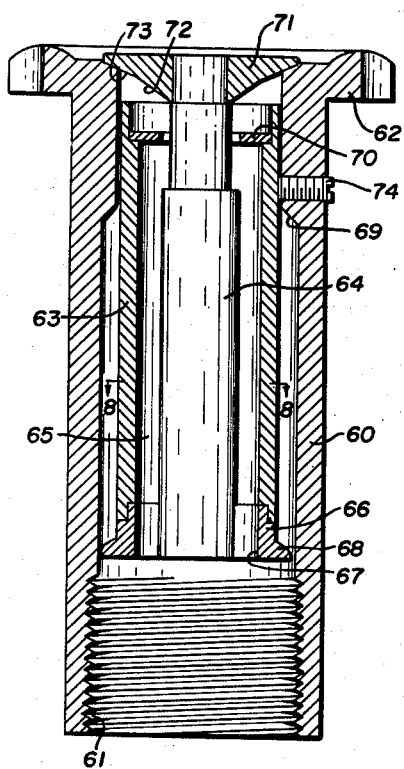
Fig. 7 is another modification of a sprinkler according to the invention.
Figure 8:
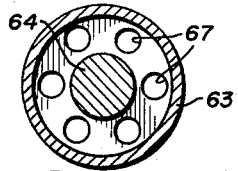
Fig. 8 is a detail of the distribution block of the sprinkler illustrated in Fig. 7, taken along lines 8—8.

The sprinklers illustrated in Figures 6 and 7 are "pop-up" type sprinklers. This type of sprinkler is adapted to be connected in a substantially vertical position with the top thereof at about ground level. Pressure of the water forces the inside, or the sprayer portion, above ground level so as to be high enough to provide a sufficient spray area. The sprinklers are adapted to be connected to a series of vertical risers from an underground piping system.

The sprinkler illustrated in Figure 6 comprises a cylindrical tubular body 45 having threaded inlet 46. The inlet is adapted for connection to an upright pipe. The body 45 terminates at its upper end in a head portion 47. When the sprinkler is connected with the pipe system, the head 47 is substantially at ground level to provide a hidden sprinkler. The "pop-up" portion of the sprinkler comprises an inner, small tube 51 having a base 49.

The base portion 49 substantially fills the opening in the tubular body 45, and a stop 50 in the tube 45 engages base 49 and prevents further upward movement of the tube 51. The stop 50 also provides a seat for the base 49, and forms a substantially liquid type seal when the head is in the "pop-up" position. Tube 51 is surrounded by an outer tube 48, which provides a space 52 therebetween. Liquid entering the inlet 46 passes into an inner passage 53 and subsequently out through holes 54 in the inner tube to fill the space 52. The upper end of the tube 48 is substantially closed by an orifice plate 55, which includes a shaped outlet encircling the tube 51, to provide the shape of the pattern to be sprinkled. A reciprocal stud 56 is secured in the tube 51 substantially closing the same. A lock nut 56a locks the stud in position in the tube 53. The upper portion of the stud 56 is threaded and a deflection head 57 is threaded thereon. The threaded stud provides means for adjusting the position of the stud in relation to outlet holes 54 for adjusting the volume of water through the sprinkler. Usually, a number of sprinklers are secured to common line, and the adjustment permits setting the individual sprinklers to produce a uniform pattern. Normally the first sprinklers in a series must be throttled to provide sufficient water for a uniform pattern of the last sprinklers in the series. The holes 54 act in a similar manner to the distributing block for providing a streamline or straight flow of fluid for impinging against the deflecting head 57. The head 57 includes two frustum surfaces, including an inner surface 58 and an outer surface 59. The surfaces are disposed at acute angles to a plane through the top of the frustum, and the angle of surface 59 is smaller than the angle of surface 58.

In the operation of the sprinkler of Figure 6, water pressure entering inlet 46 forces the spray portion up in the tubular body 45 so that the end 49 abuts and seals against stop 50. Water passes up passage 53, out through the holes 54 and up the space 52 in substantially a straight column or stream of water. The stream passes through the orifice plate and is shaped to an outside surface having substantially the same configuration as the desired spray pattern. The column of water impinges on the head and is deflected away from the sprayer into the desired pattern, and completely wets the area of the pattern. When the water is turned off and the pressure ceases, the head drops back to its closed or hidden position.

The pop-up sprayer of Figure 7 is similar to the pop-up sprinkler of Figure 6, except that it includes a lower distributing block similar to the distributing block described in Figures 1 and 4. In the pop-up sprayer of Figure 7, a tubular body 60 having a threaded inlet 61 is adapted to be secured to a riser on an underground water system, and the top 62 is adapted to be positioned at substantially ground level. The pop-up portion of the sprinkler includes a tubular member 63 enclosing a stud 64 therein and providing an annular space 65 therebetween. The tube and stud are held apart at the bottom thereof by means of the spacer block 66 to which both are secured. The spacer block is, also, the distributing block, and it includes a series of six holes 67 spaced therearound. The block 66 has a projection 68 which substantially fills the passage in the tubular body 60. The projection 68 acts as a stop and a seat when abutted against a stop 69 in the tube. The upper end of the tubular member 63 is closed by an orifice plate 70 which has a shaped opening to correspond with the desired shape of spray pattern. The stud 64 passes through the opening of the orifice plate and a distributing head 71 is secured to the top thereof. The distributing head includes two frustum surfaces, namely, an inner surface 72 and an outer surface 73 set at acute angles to a horizontal plane through the top of each frustum, the angle at which the surface 73 is set to the plane is smaller than the angle at which the surface 72 is set. The double surface deflecting head provides means for distributing a spray into the desired pattern and for completely and uniformly spreading the liquid throughout the area of the pattern. A set screw 74 in the tube 60 rides a groove in the tube 63 to prevent turning of the spray when in use.

Figure 9:
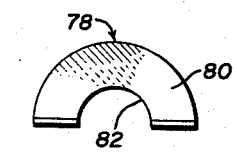
Fig. 9 is a plan view of a blocking member to blank off a portion of the spray area produced by a sprinkler of the invention.
Figure 10:
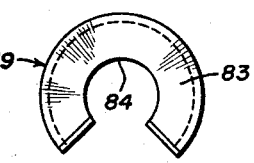
Fig. 10 is a front elevation of the device of Fig. 9.
Figure 11:
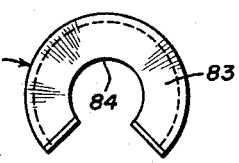
Fig. 11 is a modified blocking member for blanking off a different portion of the spray area.

The operation of the spray of Figure 7 is substantially the same as the operation of the "pop-up" spray of Figure 6. When water under pressure is supplied through the inlet 61, the tube 63 rises up until the stop at a projection 68 abuts stop 69 and the water then passes up through the distributing block through passages 67 up along the stud 64 and subsequently out as a shaped water column through the orifice plate 70. The column impinges against the head and it is deflecting into the filled, shaped pattern.

Where a segment of a particular pattern is desired, spacer blocks may be utilized between the head and the orifice plate. A spacer block 78, illustrated in Figure 9, is adapted to utilize one-half the spray area normally issuing from the orifice plate. The block includes an inverted frustum surface 80 which is adapted to seat against the inner frustum surface of a deflecting head, and a bottom 81 which is a planar surface, seats on the orifice plate closing the opening therearound. The inner surface 82 seats against the stud whereby to prevent the column of water passing up that particular section of the sprinkler. The main effect of the spacer block is to close off part of the annular orifice around the stud to stop the discharge of water from that particular segment of the annulus. The spacer block 79, illustrated in Figure 11, is adapted to close three-fourths of the orifice opening, and the block includes an inverted frustum surface 83 which is adapted to seat against the inner frustum surface of the head, and an inner surface 84 is adapted to seat against the stud holding the head on the sprayer. A planar surface on the bottom of the spacer, similar to surface 81, is adapted to close the annulus. In either case, or if a different size of spacer block is used, the spacer block seats tightly against the stud, the head, and the orifice plate to close or block the orifice opening at that particular segment. The spray issuing from the remaining open orifice maintains substantially its original shape but is, of course, only a segment of the original.

Figure 15:
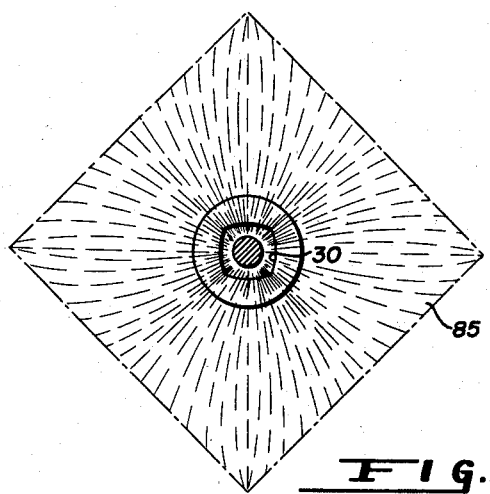
Fig. 15 is a top plan view, in partial section, of a sprinkler head according to the invention, illustrating the pattern produced.
Figure 16:
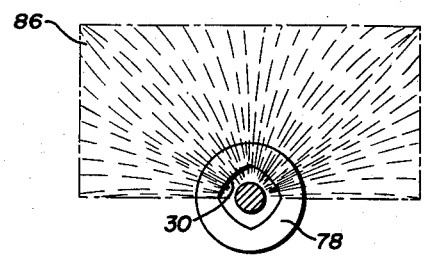
Fig. 16 is a top plan view, in partial section, of a modified sprinkler head, illustrating the pattern formed thereby.

The spray pattern illustrated in Figure 15 is a substantially square pattern, which is formed by using an approximate square orifice opening 30 as indicated in Figure 2. The spray pattern 85, Figure 15, is substantially square, and the whole area of the square is uniformly wetted by the spray so that there is formed in effect a filled pattern. By utilizing a half block 78, as illustrated in Figure 16, only one-half of a square pattern 86 is formed, the rest of the pattern being blocked off by the block. Likewise, by utilizing a three-quarters block 79, a fourth of a square 87 is obtained. The shape of the portion may be varied to meet the particular needs. For example, the quarter square may include one full side only, instead of two halves, and be of a substantial triangular shape.

The shaped orifice plate has been described as being approximately square to provide a square pattern. The outer boundary of the opening, however, may be shaped to conform to substantially any pattern outline desired. For example, instead of using an approximate square opening in the orifice plate, a round opening may be utilized to provide a round spray area. With the head having the two deflecting surfaces overhanging the discharge annulus, the resulting spray uniformly fills the shaped pattern thrown by the sprinkler. Likewise, a triangular shaped opening may be utilized to provide a triangular shaped spray. Here again, the deflecting head will provide a uniformly filled triangular pattern. Other shapes of openings may be utilized to conform with substantially any desired pattern outline. In the preferred form, however, a side of the shaped outlet which corresponds to a straight side of the desired pattern should be arcuate, as indicated for the square pattern. An arcuate edge of the orifice, having a radius of substantially the dimensions of the radius of the orifice plate will provide a straight line in the spray pattern outline.

Figure 12:
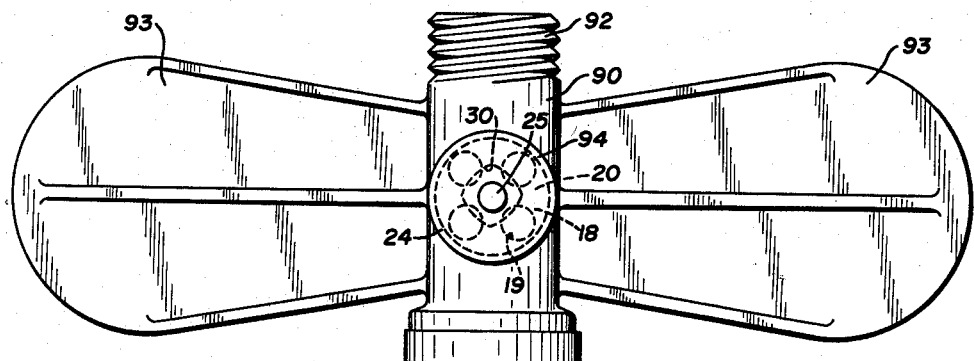
Fig. 12 is a plan view of a sprinkler according to the invention, adapted as a series sprinkler, in which the sprinkler is adapted to be attached in series to short lengths of hose or pipe.

The sprayer illustrated in Figure 12 is similar to the sprayer of Figure 1, except that it is adapted to be connected in series with other similar sprayers. The sprayer comprises a body 90 having a threaded female inlet 91 and a threaded male outlet 92 which is adapted to be connected in a water conduit, or a series of short hoses to provide a series of sprays along a line. Outriggers 93 are provided on each side of the body to stabilize the sprayer in an upright position. An upstanding boss 94 extends beyond the body 90, and a distributing plate 18 having holes 19 therein is secured in the boss. An orifice plate 20 having a shaped outlet 30 is secured in the boss. A head 24 secured by means of a stud 25 attached to the distributing block completes the assembly. The operation of the sprinkler is similar to the operation of the sprinkler described in Figure 1, except that only a portion of the water entering the inlet 91 passes through the boss and is sprayed out of the sprayer, the rest of the water passes through the body 90 and out the outlet 92 to be passed along to subsequent sprayers in the series.

Figures 13, 14:
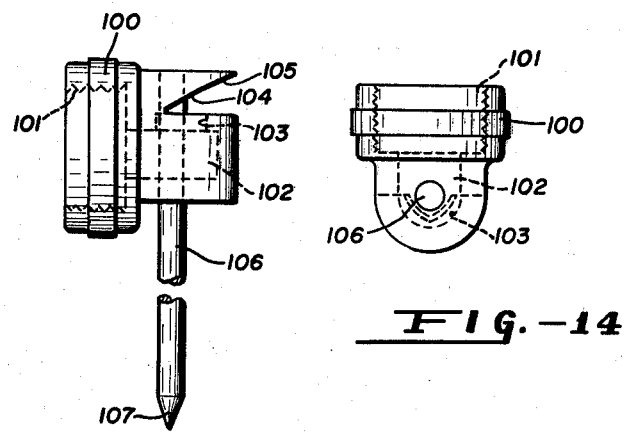
Fig. 13 is an elevational view illustrating a modified spray device adapted as a curb sprinkler.
Fig. 14 is a top plan view of the device of Fig. 13.
Figure 17:
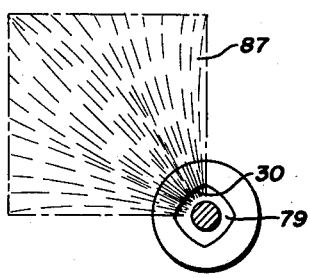
Fig. 17 is a top plan view, in partial section, of a further modified sprinkler head according to the invention, illustrating a still further modified spray pattern.

A curb-type, or fan, sprinkler may, also, be made using the features of the invention. In this instance, illustrated in Figures 13 and 14, a body 100 has a threaded inlet 101 which is adapted to be secured to a hose having an appropriate fitting. The inlet 101 leads to a passage 102 which extends into the body 100. An opening 103 which is a shaped orifice provides a shaped outlet for a chamber 102. The column of water exhausting out of outlet 103 impinges on a surface 104 which is a portion of a frustum of a cone. Another surface, which is a part of another frustum of a cone 105, extends beyond the surface 104. The surfaces 104 and 105 constitute approximately one-half of a deflection head, such as illustrated in Figure 3. A spike 106 passes completely through the device, and provides the same effect of being the inner boundary of the annular orifice, since it passes through the orifice 103. The spike 106 has a sharp point 107 which is adapted for sticking in the ground for holding the sprinkler in correct position. Water entering the inlet at 101 passes through into passage 102, subsequently out the orifice 103. Water exhausting out the orifice 103 impinges upon the two surfaces 104 and 105 and is spread in a substantial fan shaped pattern. The surfaces, however, provide for a completely filled area of the fan shape. While conventional shape fan sprayers do provide a fan-shaped outline, the spray does not completely fill the area within the pattern, so that substantial overlapping of areas must be accomplished to completely wet the area touched by the spray. With the present fan spray, however, the area within the outline is uniformly and completely wet so that one setting of the sprayer will completely irrigate the particular pattern and no overlapping will be required to completely wet the area.

Various types of sprinklers may be made utilizing the principle of the invention to produce a shaped pattern which is uniformly wetted. In addition to the types illustrated, an inexpensive sprinkler may be provided by providing a complete annular orifice for the curb sprinkler of Figure 13. In such a case, the spike would extend through the sprinkler body and a head, similar to Figure 3, would be provided instead of the half head of the curb sprinkler. Four or more holes below the shaped orifice provides a distributing block for a straight or streamline flow of water impinging against the distributing head. The sprinkler may provide various shaped orifice plates, however, round or square patterns are preferable as the sprinkler is of the mobile type.

Two major parts, which are the shaped annular orifice and the two-surfaced head, provide the means for producing the filled pattern, and these elements may be utilized in substantially any type of sprayer, various types of which are illustrated in the drawings. The distributing block below of the orifice plate is, likewise, a major factor in providing for the filled pattern at varying pressures. Conventional sprayers utilize a spinning stream of water against a single deflection plate in an attempt to provide a predetermined shaped pattern for irrigation. If the pattern is obtainable by the swirling water device, the pattern will not be filled. Furthermore, changes in pressure will change the swirling of the water and the pattern will be changed, due to the difference in deflection of the water against the deflecting plate. With the present invention, however, the streamline or straight flow of fluid against the deflection plate will be substantially the same at all pressures and velocities, whereby the size of the pattern may vary but the shape of the pattern will remain substantially the same. The value of the completely filled pattern is realized in not avoiding the necessity of overlapping sprayed areas to provide complete irrigation for the entire area. This is especially important in a fixed or underground watering system. In the underground watering system utilizing the sprinklers of the present invention, the sprinklers may be set a prescribed point with a minimum of overlapping (to make allowance for pressure changes) and still be assured that the entire area will be adequately and uniformly irrigated. Since the area serviced by a single sprinkler is uniformly wetted, fewer sprinklers are necessary to provide irrigation of a given area and a more economical system is therefore provided.

While the invention has been illustrated by specific devices, there is no intent to limit the invention to the precise details so set forth, except insofar as set forth in the following claims.

I claim:

1. A water sprinkler comprising a hollow body having means for its attachment to a supply line and having a plurality of upright passages interiorly of the body for directing circulating water in linear streams to an elevated discharge outlet, said outlet comprising a four-sided opening adjacent the top of said hollow body and a member interiorly of said opening extending upwardly therethrough and defining therewith a restricted annular discharge passage for the elevated linear streams, and a head mounted on said upright member above said outlet and providing an overhang of substantial extent laterally beyond said passage, the under surface of said head having two angularly disposed surfaces at a low angle to the horizontal, the innermost being at a greater angle to the horizontal than the outermost, whereby the non-rotational discharge is directed outwardly to form a spray pattern similar to the shape of the outer circumference of said outlet.

2. A sprinkler as defined in claim 1, in which one said angular surface is disposed at approximately a 10° greater angle to the horizontal than the other.

References Cited in the file of this patent

UNITED STATES PATENTS

| | | |
|---|---|---|
| 879,892 | Packard | Feb. 25, 1908 |
| 1,271,939 | Reeves | July 9, 1918 |
| 1,510,930 | Enell | Oct. 7, 1924 |
| 1,758,119 | Moon | May 13, 1930 |
| 1,780,233 | Jenkins | Nov. 4, 1930 |
| 1,847,921 | Bowers | Mar. 1, 1932 |
| 1,881,409 | Moon | Oct. 4, 1932 |
| 2,190,639 | Wittek | Feb. 13, 1940 |
| 2,434,767 | Hertel | Jan. 20, 1948 |
| 2,535,723 | Coombs | Dec. 26, 1950 |
| 2,631,889 | Johnson | Mar. 17, 1953 |